(12) United States Patent
Munshi et al.

(10) Patent No.: US 8,341,611 B2
(45) Date of Patent: Dec. 25, 2012

(54) APPLICATION INTERFACE ON MULTIPLE PROCESSORS

(75) Inventors: Aaftab Munshi, Los Gatos, CA (US); Jeremy Sandmel, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 1371 days.

(21) Appl. No.: 11/800,183

(22) Filed: May 3, 2007

(65) Prior Publication Data

US 2008/0276220 A1 Nov. 6, 2008

Related U.S. Application Data

(60) Provisional application No. 60/923,030, filed on Apr. 11, 2007, provisional application No. 60/925,574, filed on Apr. 20, 2007.

(51) Int. Cl.
*G06F 9/45* (2006.01)

(52) U.S. Cl. .......................... 717/149; 717/114

(58) Field of Classification Search .................. 717/149; 719/323

See application file for complete search history.

(56) References Cited

U.S. PATENT DOCUMENTS

| | | | |
|---|---|---|---|
| 5,301,324 | A | 4/1994 | Dewey et al. |
| 6,179,489 | B1 | 1/2001 | So et al. |
| 6,588,008 | B1 | 7/2003 | Heddes et al. |
| 6,768,901 | B1 | 7/2004 | Osborn et al. |

(Continued)

FOREIGN PATENT DOCUMENTS

EP 0884678 A2 12/1998

(Continued)

OTHER PUBLICATIONS

Ian Buck, Tim Foley, Daniel Horn, Jeremy Sugerman, Kayvon Fatahalian, Mike Houston, and Pat Hanrahan. 2004. Brook for GPUs: stream computing on graphics hardware. In ACM SIGGRAPH 2004 Papers (SIGGRAPH '04), Joe Marks (Ed.). ACM, New York, NY, USA, 777-786. DOI=10.1145/1186562.1015800 http://doi.acm.org/10.1145/1186562.1015800.*

(Continued)

*Primary Examiner* — Wei Zhen
*Assistant Examiner* — Matthew Brophy
(74) *Attorney, Agent, or Firm* — Blakely, Sokoloff, Taylor & Zafman LLP

(57) ABSTRACT

A method and an apparatus that execute a parallel computing program in a programming language for a parallel computing architecture are described. The parallel computing program is stored in memory in a system with parallel processors. The system includes a host processor, a graphics processing unit (GPU) coupled to the host processor and a memory coupled to at least one of the host processor and the GPU. The parallel computing program is stored in the memory to allocate threads between the host processor and the GPU. The programming language includes an API to allow an application to make calls using the API to allocate execution of the threads between the host processor and the GPU. The programming language includes host function data tokens for host functions performed in the host processor and kernel function data tokens for compute kernel functions performed in one or more compute processors, e.g. GPUs or CPUs, separate from the host processor. Standard data tokens in the programming language schedule a plurality of threads for execution on a plurality of processors, such as CPUs or GPUs in parallel. Extended data tokens in the programming language implement executables for the plurality of threads according to the schedules from the standard data tokens.

26 Claims, 11 Drawing Sheets

U.S. PATENT DOCUMENTS

| | | | |
|---|---|---|---|
| 6,862,027 B2* | 3/2005 | Andrews et al. | 345/505 |
| 6,919,896 B2 | 7/2005 | Sasaki et al. | |
| 6,970,206 B1 | 11/2005 | Swan et al. | |
| 7,015,913 B1 | 3/2006 | Lindholm et al. | |
| 7,598,953 B2* | 10/2009 | Tarditi, Jr. et al. | 345/440 |
| 7,814,486 B2 | 10/2010 | Papakipos et al. | |
| 8,108,844 B2* | 1/2012 | Crutchfield et al. | 717/149 |
| 8,136,104 B2* | 3/2012 | Papakipos et al. | 717/146 |
| 2002/0066086 A1 | 5/2002 | Linden | |
| 2004/0068716 A1 | 4/2004 | Stevens | |
| 2005/0027812 A1 | 2/2005 | Bozak et al. | |
| 2005/0081201 A1 | 4/2005 | Aguilar et al. | |
| 2005/0086669 A1* | 4/2005 | Boyd et al. | 719/328 |
| 2005/0122334 A1 | 6/2005 | Boyd | |
| 2005/0132239 A1 | 6/2005 | Athas et al. | |
| 2005/0235287 A1 | 10/2005 | Harper | |
| 2006/0005178 A1* | 1/2006 | Kilgard et al. | 717/153 |
| 2006/0048157 A1 | 3/2006 | Dawson et al. | |
| 2006/0059494 A1 | 3/2006 | Wexler et al. | |
| 2006/0070047 A1 | 3/2006 | Narayanasamy et al. | |
| 2006/0132489 A1 | 6/2006 | Blaho | |
| 2006/0143615 A1 | 6/2006 | Kondo et al. | |
| 2007/0033572 A1 | 2/2007 | Donovan et al. | |
| 2007/0106999 A1* | 5/2007 | Zhang | 719/323 |
| 2007/0143765 A1 | 6/2007 | Aridor et al. | |
| 2007/0294512 A1* | 12/2007 | Crutchfield et al. | 712/200 |
| 2007/0294666 A1 | 12/2007 | Papakipos et al. | |
| 2007/0294681 A1* | 12/2007 | Tuck et al. | 717/149 |
| 2007/0294693 A1 | 12/2007 | Barham | |
| 2008/0109795 A1 | 5/2008 | Buck et al. | |
| 2008/0201716 A1 | 8/2008 | Du et al. | |
| 2011/0035737 A1* | 2/2011 | Stefansson et al. | 717/149 |

FOREIGN PATENT DOCUMENTS

| | | |
|---|---|---|
| EP | 1498824 A2 | 1/2005 |
| WO | WO 98/19238 A1 | 5/1998 |
| WO | WO 2007/017456 A1 | 2/2007 |

OTHER PUBLICATIONS

William R. Mark, R. Steven Glanville, Kurt Akeley, and Mark J. Kilgard. 2003. Cg: a system for programming graphics hardware in a C-like language. ACM Trans. Graph. 22, Jul. 3, 2003, 896-907. DOI=10.1145/882262.882362 http://doi.acm.org/10.1145/882262.882362.*

Gunsalus, G.L. "Task/CPU Affinity Design," IBM Technical Disclosure Bulletin, IBM Corp. New York, US, vol. 16, No. 2 (Jul. 1973), pp. 654-657, Document No. XP002406010.

Jacob, Nigel et al. "Offloading IDS Computation to the GPU," Proceedings of the $22^{22}$ Annual Computer Security Applications Conference (ACSAC'06), IEEE (Dec. 2006), pp. 371-380, Document No. XP031033576.

McCool, Michael D. "Data-Parallel Programming on the Cell BE and the GPU using the RapidMind Development Platform," GSPx Multicore Applications Conference (Oct. 31, 2006-Nov. 2, 2006), 9 pages, Document No. XP002502801.

Noll, Albert et al. "CellVM: A Homogeneous Virtual Machine Runtime System for a Heterogeneous Single-Chip Multiprocessor," Technical Report No. 06-17, Donald Bren School of Information and Computer Science, University of California, Irvine (Nov. 2006), pp. 1-11, Document No. XP002510739.

PCT International Preliminary Report on Patentability for PCT Application No. PCT/US2008/004652, mailed Dec. 10, 2009 (13 pages).

PCT International Search Report and Written Opinion for PCT International Appln No. PCT/US2008/004652, mailed Nov. 24, 2009 (23 pages).

PCT Invitation to Pay Additional Fees for PCT International Appln No. PCT/US2008/004652, mailed Nov. 21, 2008 (7 pages).

PCT International Search Report and Written Opinion for PCT International Appln No. PCT/US2008/004617 mailed Nov. 11, 2008 (12 pages).

PCT International Search Report and Written Opinion for PCT International Appln No. PCT/US2008/004606 mailed Nov. 26, 2008 (12 pages).

PCT International Preliminary Report on Patentability for PCT Application No. PCT/US2008/004648, mailed Oct. 22, 2009 (11 pages).

PCT International Search Report and Written Opinion for PCT International Appln No. PCT/US2008/004648, mailed Jan. 28, 2009 (18 pages).

PCT Invitation to Pay Additional Fees for PCT International Appln No. PCT/US2008/004648, mailed Nov. 10, 2008 (6 pages).

Peakstream. "The Peakstream Platform: High Productivity Software Development for Multi-Core Processors," (Mar. 5, 2007), pp. 1-12, Document No. XP002502799.

Shilov, Anton. "NVIDIA's Graphics Cards to Take Advantage of Multi-Core Chips," X-bit labs (Jun. 20, 2005), 2 pages, Document No. XP002554367, on the Internet at: URL:http://www.xbitlabs.com/news/video/display/20050620133439.html>.

Stokes, Jon. "Peakstream unveils multicore and CPU/GPU programming solution," (Sep. 18, 2006), 3 pages, Document No. XP002502800, on the Internet at: URL:http://arstechnica.com/news.ars/post/20060918-7763.html>.

Tarditi, David et al. "Accelerator: Using Data Parallelism to Program GPUs for General-Purpose Uses," ASPLOS'06, San Jose, California (Oct. 21-25, 2006), pp. 325-335, Document No. XP002500986.

Woodcock, Joanne et al. Computer Dictionary, 1993, Microsoft Press, Second Edition, p. 85.

"Writing Applications for the GPU Using the RapidMind Development Platform," RapidMind, Inc., 2006, 7 pages.

* cited by examiner

900

```
                 ╱─905
              ⤹
  __kernel void                           ╱─901
  imageFilter (int n, int m, const float *filter_weights, ⤹
              __stream image src_image,  __stream image  dst_image) ⤹─903
  {
          int     i, j;
          int     indx = 0;
          int     tid_x = cu_thread_id.x + (cu_block_id.x * cu_thread_dim.x);
          int     tid_y = cu_thread_id.y + (cu_block_id.y * cu_thread_dim.y);
          float4  filter_result = float4(0.0, 0.0, 0.0, 0.0);

for (i=-m/2; i<(m+1)/2; i++)
          {
                  for (j=-n/2; j<(n+1)/2; j++)
                  {
                          float w = filter_weights[indx++];
                          if( w!= 0.0)
                          {
                                  filter_result += w*readimage(src_image,
                                                  tid_x+j, tid_y+i,
                                                  false,
                                                  CU_FILTER_NEAREST,
                                                  CU_ADDRESS_CLAMP_TO_EDGE);
                          }
                  }
          }
          writeimage(dst_image, tid_x, tid_y, filter_result);
  }
```

Fig. 9

```
void exec_image_filter_kernel(cu_context context,
                    int filter_w, int filter_h,
                    const float *filter_weights, const char *image_filter_src,    1000
                    int cu_img_num_channels,
                    int cu_img_channel_size,
                    void *src_image, void *dst_image)
{
        char        *args_name[] = {"n", "m", "filter_weights", "src_image", "dstimage"};
        char        *args_type[] = {"int", "int", "const float *",
                                    "__stream image", "__stream image"};
        int         args_array_size[] = {sizeof(int), sizeof(int), sizeof(float)*n*m,
                                    sizeof(cu_stream), sizeof(cu_steream)};

void        *args_value[5];
        cu_kernel   kernel;
        cu_stream   in_stream, out_stream;
        cu_event    event;
        int         thread_dim[3], block_dim[3];

// allocate the input and out put streams
        in_stream = cuAllocImageStream(context, cu_img_num_channels,
                                    cu_img_channel_size, w, h);
        out_stream = cuAllocImageStream(context, cu_img_num_channels,
                                    cu_img_channel_size, w, h);

//load the input stream image
        cuWriteImageStream(context, in_stream, 0, 0, w, h, src_image);

kernel = cuCreateKernel(context,);
        cuLoadKernelSource(context, kernel, 1, image_filter_src, NULL);
        cuBuildKernelExecutable(context, kernel);
        cuUseKernelExecutable(context, kernel, CU_KERNEL_ONLINE_EXECUTABLE);

//set execution args
        args_value[0] = (void*)&filter_w;       args_value[1] = (void*)&fitler_h;
        args_value[2] = (void*)filter_weights;  args_value[3] = (void*)in_stream;
        args_value[4] = (void*)out_stream;
        cuSetKernelArgs(context,kernel,5,args_name,args_type,args_array_size,args_value);

//set thread and block dimensions
        thread_dim[0] = 16; thread_dim[1] = 16; thread_dim[2] = 1;
        block_dim[0] = (w/16); block_dim[1] = (h/16); block_dim[2] = 1;

//execute kernel
        cuExecuteKernel(context, kernel, kernel_args, NULL, thread_dim, block_dim, &event);

//synchronous mode – wait for kernel execution to complete
        cuGetKernelEventStatus(context, event, CU_EVENT_WAIT_FOR_COMPLETION, NULL);

//read output stream
        cuReadImageStream(context, out_stream,0,0,w,h,dst_image);

//delete event, kernel, in- and out-streams
        cuDeleteEvent(context, event); cuDleteKernel(context, kernel);
        cuDeleteStream(context, in_stream); cuDeleteStream(context, out_stream);
}
```

Fig. 10

APPLICATION INTERFACE ON MULTIPLE PROCESSORS

CROSS-REFERENCE TO RELATED APPLICATIONS

This application is related to, and claims the benefits of, U.S. Provisional Patent Application No. 60/923,030, filed on Apr. 11, 2007 entitled "DATA PARALLEL COMPUTING ON MULTIPLE PROCESSORS," Aaftab Munshi et al. and U.S. Provisional Patent Application No. 60/925,574, filed on Apr. 20, 2007 entitled "APPLICATON INTERFACE ON MULTIPLE PROCESSORS," Aaftab Munshi, which are hereby incorporated herein by reference.

FIELD OF INVENTION

The present invention relates generally to data parallel computing. More particularly, this invention relates to application interface for data parallel computing across both CPUs (Central Processing Units) and GPUs (Graphical Processing Units).

BACKGROUND

As GPUs continue to evolve into high performance parallel compute devices, more and more applications are written to perform data parallel computations in GPUs similar to general purpose compute devices. Today, these applications are designed to run on specific GPUs using vendor specific interfaces. Thus, they are not able to leverage CPUs even when both GPUs and CPUs are available in a data processing system nor can they be leveraged across GPUs from different vendors where such an application is running.

However, as more and more CPUs embrace multiple cores to perform data parallel model of computations, more and more processing tasks can be supported by either CPUs and/or GPUs whichever are available. Traditionally, GPUs and CPUs are configured through separate programming environments not compatible with each other. Most GPUs require dedicated programs which are vendor specific. As a result, it is very difficult for an application to leverage both CPUs and GPUs for processing resources, such as GPUs with data parallel computing capabilities together with multi-core CPUs.

Therefore, there is a need in modern data processing systems to overcome the above problems to allow an application to perform a task in any available processing resources, such as CPUs and one or more GPUs, capable of performing the task.

SUMMARY OF THE DESCRIPTION

An embodiment of the present invention includes methods and apparatuses that execute a parallel computing program in a programming language for a parallel computing architecture. The parallel computing program is stored in memory in a system with parallel processors. The system includes a host processor, one or more graphics processing units (GPUs) coupled to the host processor and a memory coupled to at least one of the host processor and the GPUs. The parallel computing program is stored in the memory and contains appropriate binary versions for possible compute devices that the program could be run on (i.e. a multi-core CPU or GPUs). The program executables can be generated online or offline. The programming language includes an API to allow an application to execute data parallel programs on one or more compute devices.

In an alternative embodiment, a machine readable medium includes a plurality of data tokens comprising host function data tokens and compute kernel function data tokens. The host function data tokens correspond to one or more host functions to be performed in the host processor. The compute kernel function data tokens correspond to one or more compute kernel functions to be performed in one or more compute processors, e.g. GPUs or CPUs, separate from the host processor. A host function and a compute kernel function are performed in separate processors.

In an alternative embodiment, the data tokens in the programming language include standard data tokens and extended data tokens. The standard data tokens schedule a plurality of threads for execution on a plurality of processors in parallel. The plurality of processors include central processing units (CPUs) and graphic processing units (GPUs). The extended data tokens implement executables for the plurality of threads executing on the plurality of processors.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 9 is a sample source code illustrating an example of a compute kernel source for a compute kernel executable to be executed in a plurality of physical compute devices;

FIG. 10 is a sample source code illustrating an example to configure a logical compute device for executing one of a plurality of executables in a plurality of physical compute devices by calling APIs;

DETAILED DESCRIPTION

Figure 1:
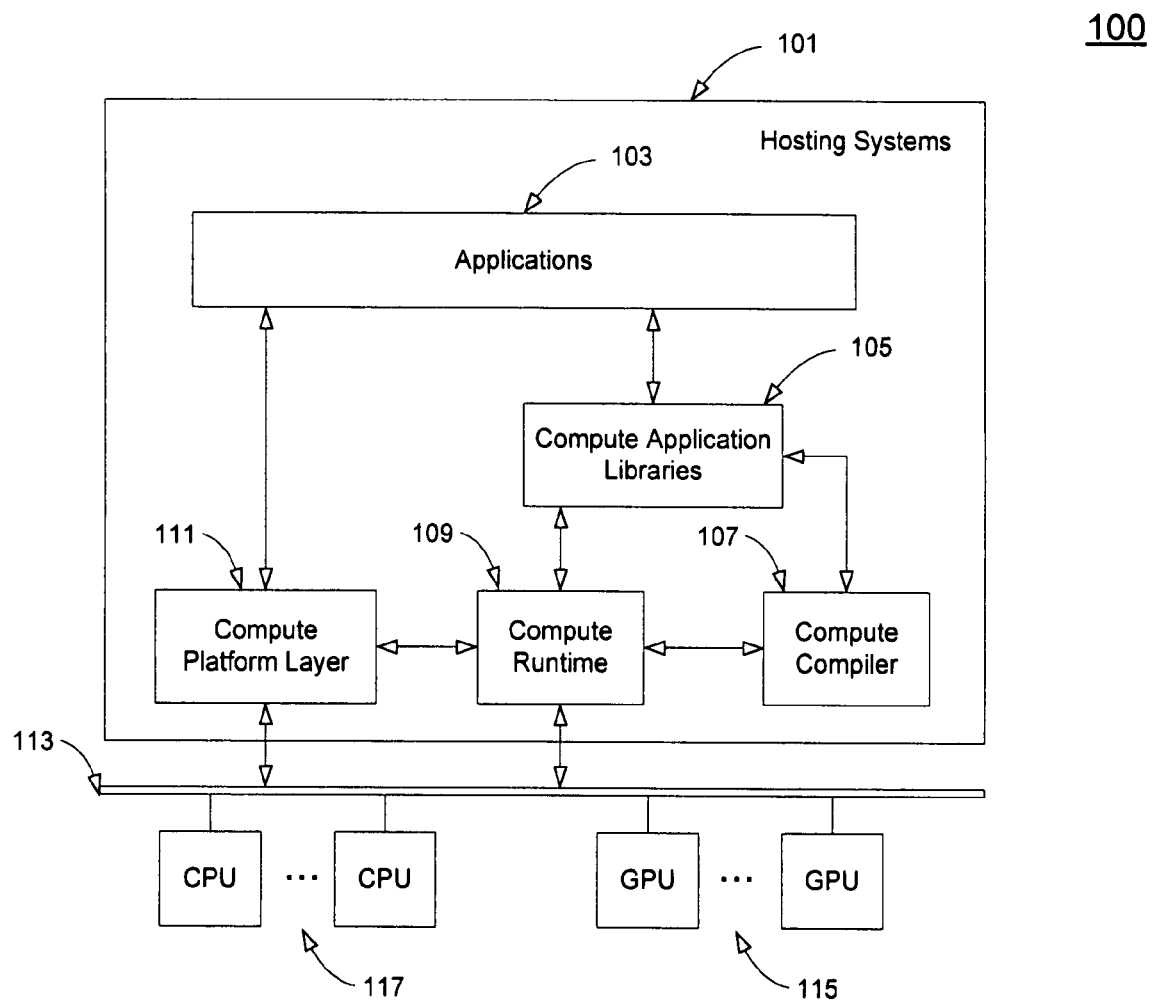
FIG. 1 is a block diagram illustrating one embodiment of a system to configure compute devices including CPUs and/or GPUs to perform data parallel computing for applications.

A method and an apparatus for data parallel computing on multiple processors are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

A Graphics Processing Unit (GPU) may be a dedicated graphics processor implementing highly efficient graphics operations, such as 2D, 3D graphics operation and/or digital video related functions. A GPU may include special (programmable) hardware to perform graphics operations, e.g. blitter operations, texture mapping, polygon rendering, pixel shading and vertex shading. GPUs are known to fetch data from a frame buffer and blend pixels together to render an image back into the frame buffer for display. GPUs may also control the frame buffer and allow the frame buffer to be used to refresh a display, such as a CRT or LCD display, which is a short persistence display that requires refresh at a rate of at least 20 Hz (e.g. every 1/30 of a second, the display is refreshed with data from a frame buffer. Usually, GPUs may take graphics processing tasks from CPUs coupled with the GPUs to output raster graphics images to display devices through display controllers. References in the specification to "GPU" may be a graphics processor or a programmable graphics processor as described in "Method and Apparatus for Multitheraded Processing of Data In a Programmable Graphics Processor", Lindholdm etl al., U.S. Pat. No. 7,015,913, and "Method for Deinterlacing Interlaced Video by A Graphics Processor", Swan et al., U.S. Pat. No. 6,970,206, which are hereby incorporated by reference In one embodiment, a plurality of different types of processors, such as CPUs or GPUs may perform data parallel processing tasks for one or more applications concurrently to increase the usage efficiency of available processing resources in a data processing system. Processing resources of a data processing system may be based on a plurality of physical compute devices. A physical compute device maybe a CPU or a GPU. In one embodiment, data parallel processing tasks may be delegated to a plurality types of processors, for example, CPUs or GPUs capable of performing the tasks. A data processing task may require certain specific processing capabilities from a processor. Processing capabilities may be, for example, dedicated texturing hardware support, double precision floating point arithmetic, dedicated local memory, stream data cache, or synchronization primitives. Separate types of processors may provide different yet overlapping sets of processing capabilities. For example, both CPU and GPU may be capable of performing double precision floating point computation. In one embodiment, an application is capable of leveraging either a CPU or a GPU, whichever is available, to perform a data parallel processing task.

In another embodiment, selecting and allocating a plurality of different types of processing resources for a data parallel processing task may be performed automatically during run time. An application may send a hint including desired list of capability requirements for a data processing task though an API (Application Programming Interface) to a runtime platform of a data processing system. In accordance, the runtime platform may determine a plurality of currently available CPUs and/or GPUs with capabilities matching the received hint to delegate the data processing task for the application. In one embodiment, the list of capability requirements may depend on the underlying data processing task. A capability requirement list may be applicable across different sets of processors including, for example, GPUs and multi-core CPUs from different vendors and of different versions. Consequently, an application may be insulated from providing programs targeting a particular type of CPU or GPU.

FIG. 1 is a block diagram illustrating one embodiment of a system to configure compute devices including CPUs and/or GPUs to perform data parallel computing for applications. System 100 may implement a parallel computing architecture. In one embodiment, system 100 may be a graphics system including one or more host processors coupled with one or more central processors 117 and one or more other processors such as media processors 115 through a data bus 113. The plurality of host processors may be networked together in hosting systems 101. The plurality of central processors 117 may include multi-core CPUs from different vendors. A media processor may be a GPU with dedicated texture rendering hardware. Another media processor may be a GPU supporting both dedicated texture rendering hardware and double precision floating point arithmetic. Multiple GPUs may be connected together f or Scalable Link Interface (SLI) or CrossFire configurations.

In one embodiment, the hosting systems 101 may support a software stack including software stack components such as applications 103, a compute platform layer 111, a compute runtime layer 109, a compute compiler 107 and compute application libraries 105. An application 103 may interface with other stack components through API (Application Programming Interface) calls. One ore more threads may be running concurrently for an application 103 in the hosting systems 101. The compute platform layer 111 may maintain a data structure, or a compute device data structure, storing processing capabilities for each attached physical compute device. In one embodiment, an application may retrieve information about available processing resources of the hosting systems 101 through the compute platform layer 111. An application may select and specify capability requirements for performing a processing task through the compute platform layer 111. Accordingly, the compute platform layer 111 may determine a configuration for physical compute devices to allocate and initialize processing resources from the attached CPUs 117 and/or GPUs 115 for the processing task. In one embodiment, the compute platform layer 111 may generate one or more logical compute devices for the application corresponding to one or more actual physical compute devices configured.

The compute runtime layer 109 may manage the execution of a processing task according to the configured processing resources for an application 103, such as, for example, one or more logical compute devices. In one embodiment, executing a processing task may include creating a compute kernel object representing the processing task and allocating memory resources, e.g. for holding executables, input/output data etc. An executable loaded for a compute kernel object may be a compute kernel object. A compute executable may be included in a compute kernel object to be executed in a compute processor, such as a CPU or a GPU. The compute runtime layer 109 may interact with the allocated physical devices to carry out the actual execution of the processing task. In one embodiment, the compute runtime layer 109 may coordinate executing multiple processing tasks from different applications according to run time states of each processor, such as CPU or GPU configured for the processing tasks. The compute runtime layer 109 may select, based on the run time states, one or more processors from the physical devices configured to perform the processing tasks. Performing a processing task may include executing multiple threads of one or more executables in a plurality of physical processing devices concurrently. In one embodiment, the compute runtime layer 109 may track the status of each executed processing task by monitoring run time execution statuses of each processor.

The runtime layer may load one or more executables corresponding to a processing task from an application 103. In one embodiment, the compute runtime layer 109 automatically loads additional executables required to perform a processing task from a compute application library 105. The compute runtime layer 109 may load both an executable and its corresponding source program for a compute kernel object from an application 103 or the compute application library 105. A source program for a compute kernel object may be a compute kernel program. A plurality of executables based on a single source program may be loaded according to a logical compute device configured to include multiple types and/or different versions of physical compute devices. In one embodiment, the compute runtime layer 109 may activate a compute compiler 107 to online compile a loaded source program into an executable optimized for a target processor, e.g. a CPU or a GPU, configured to execute the executable.

An online compiled executable may be stored for future invocation in addition to existing executables according to a corresponding source program. In addition, the compute executables may be compiled offline and loaded to the compute runtime 109 via API calls. The compute application library 105 and/or applications 103 may load an associated executable in response to library API requests from an application. Newly compiled executables may be dynamically updated for the compute application libraries 105 or for applications 103. In one embodiment, the compute runtime 109 may replace an existing compute executable in an application by a new executable online compiled through the compute compiler 107 for a newly upgraded version of compute device. The compute runtime 109 may insert a new executable online compiled to update a compute application library 105. In one embodiment, the compute runtime 109 may invoke the compute compiler 107 when loading an executable for a processing task. In another embodiment, the compute compiler 107 may be invoked offline to build executables for the compute application library 105. The compute compiler 107 may compile and link a compute kernel program to generate a compute kernel executable. In one embodiment, the compute application library 105 may include a plurality of functions to support, for example, development toolkits and/or image processing. Each library function may correspond to a compute source program and one or more executables stored in the compute application library 105 for a plurality of physical compute devices.

Figure 2:
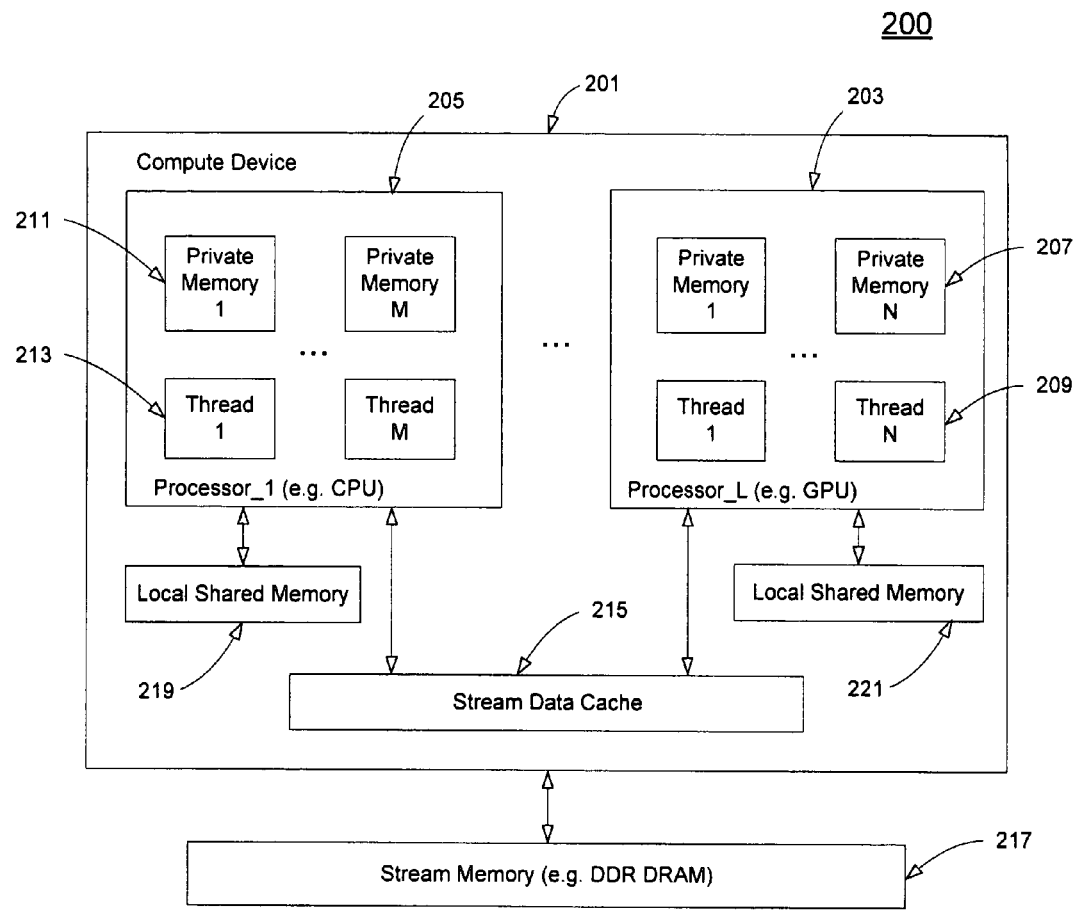
FIG. 2 is a block diagram illustrating an example of a compute device with multiple compute processors operating in parallel to execute multiple threads concurrently.

FIG. 2 is a block diagram illustrating an example of a compute device with multiple compute processors operating in parallel to execute multiple threads concurrently. Each compute processor may execute a plurality of threads in parallel (or concurrently). Threads that can be executed in parallel may be referred to as a thread block. A compute device could have multiple thread blocks that can be executed in parallel. For example, M threads are shown to execute as a thread block in compute device 205. Threads in multiple thread blocks, e.g. thread 1 of compute processor_1 205 and thread N of compute processor_L 203, may execute in parallel across separate compute processors on one compute device or across multiple compute devices. A plurality of thread blocks across multiple compute processors may execute a compute kernel executable in parallel. More than one compute processors may be based on a single chip, such as an ASIC (Application Specific Integrated Circuit) device. In one embodiment, multiple threads from an application may be executed concurrently in more than one compute processors across multiple chips.

A compute device may include one or more compute processors such as Processor_1 205 and Processor_L 203. A local memory may be coupled with a compute processor. Shared memory among threads in a single thread block running in a compute processor may be supported by the local memory coupled with the compute processor. Multiple threads from across different thread blocks, such as thread 1 213 and thread N 209, may share a stream stored in a stream memory 217 coupled to the compute device 201. A stream may be a collection of elements that can be operated on by a compute kernel executable, such as an image stream or a variable stream. A variable stream may be allocated to store global variables operated on during a processing task. An image stream may be a buffer which may be used for an image, texture or frame-buffer.

In one embodiment, a local memory for a compute processor may be implemented as a dedicated local storage, such as local shared memory 219 for Processor_1 and local shared memory 211 for Processor_L. In another embodiment, a local memory for a compute processor may be implemented as a stream read-write cache for a stream memory for one or more compute processors 2 of a compute device, such as stream data cache 215 for compute processors 205 203 in the compute device 201. In another embodiment, a local memory may implement a dedicated local storage for sharing among threads in a thread block running in a compute processor coupled with the local memory, such as local shared memory 219 coupled with Processor_1 205. A dedicated local storage may not be shared by threads across different thread blocks. If the local memory of a compute processor, such as Processor_1 205*m* is implemented as a steam read-write cache, e.g. stream data cache 215, a variable declared to be in the local memory may be allocated from the stream memory 217 and cached in the implemented stream read-write cache, e.g. stream data cache 215, that implements the local memory. Threads within a thread block may share local variables allocated in the stream memory 217 when, for example, neither stream read-write cache nor dedicated local storage are available for the corresponding compute device. In one embodiment, each thread is associated with a private memory to store thread private variables that are used by functions called in the thread. For example, private memory 1 211 may only be accessed by thread 1 213.

Figure 3:
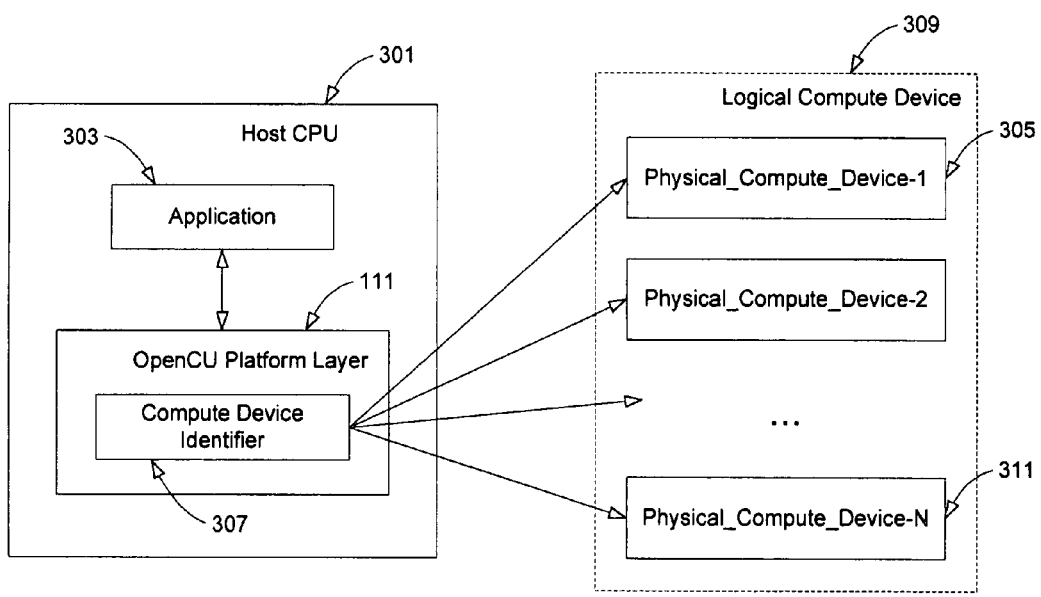
FIG. 3 is a block diagram illustrating one embodiment of a plurality of physical compute devices configured as a logical compute device via a compute device identifier.

FIG. 3 is a block diagram illustrating one embodiment of a plurality of physical compute devices configured as a logical compute device via a compute device identifier. In one embodiment, an application 303 and a platform layer 305 may be running in a host CPU 301. The application 303 may be one of the applications 103 of FIG. 1. Hosting systems 101 may include the host CPU 301. Each of the physical compute devices Physical_Compute_Device-1 305 ... Physical_Compute_Device-N 311 may be one of the CPUs 117 or GPUs 115 of FIG. 1. In one embodiment, the compute platform layer 111 may generate a compute device identifier 307 in response to API requests from the application 303 for configuring data parallel processing resources according to a list of capability requirements included in the API requests. The compute device identifier 307 may refer to a selection of actual physical compute devices Physical_Compute_Device-1 305 ... Physical_Compute_Device-N 311 according to the configuration by the compute platform layer 111. In one embodiment, a logical compute device 309 may represent the group of selected actual physical compute devices separate from the host CPU 301.

Figure 4:
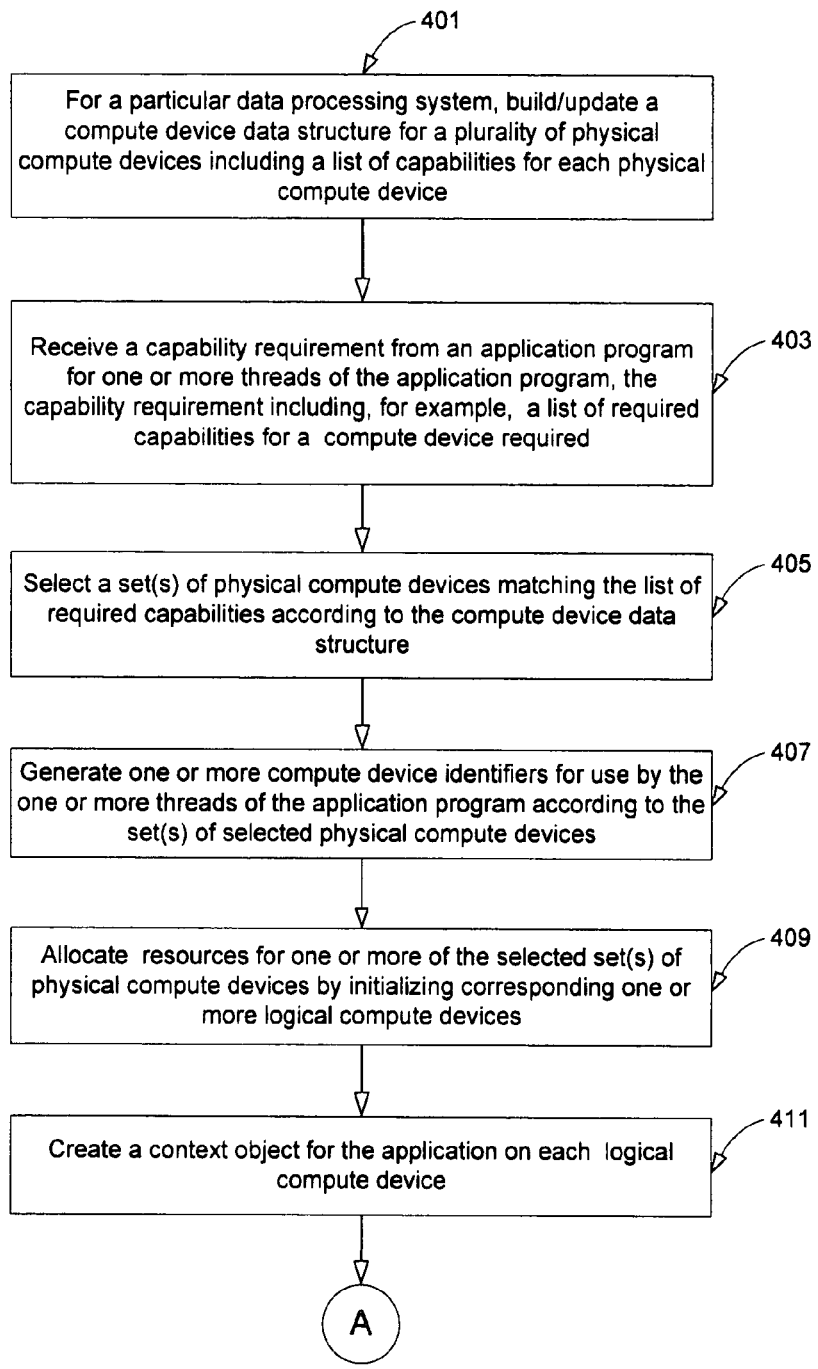
FIG. 4 is a flow diagram illustrating an embodiment of a process to configure a plurality of physical compute devices with a compute device identifier by matching a capability requirement received from an application.

FIG. 4 is a flow diagram illustrating an embodiment of a process to configure a plurality of physical compute devices with a compute device identifier by matching a capability requirement received from an application. Process 400 may be performed in accordance with the system 100 of FIG. 1 in a data processing system hosted by the hosting systems 101. The data processing system may include a host processor hosting a platform layer, such as compute platform layer 111 of FIG. 1, and a plurality of physical compute devices attached to the host processor, such as CPUs 117 and GPUs 115 of FIG. 1.

At block 401, in one embodiment, process 400 may build a data structure (or a compute device data structure) representing a plurality of physical compute devices associated with one or more corresponding capabilities. Each physical compute device may be attached to the processing system performing the process 400. Capabilities or compute capabilities of a physical compute device, such as CPU or GPU, may include whether the physical compute device support a processing feature, a memory accessing mechanism or a named extension. A processing feature may be related to dedicated texturing hardware support, double precision floating point arithmetic or synchronization support (e.g. mutex). A memory accessing mechanism for a physical processing device may be related to a type of variable stream cache, a type of image stream cache or a dedicated local memory support. A system application of the data processing system may update the data structure in response to attaching a new physical compute device to a data processing system. In one embodiment, the capabilities of a physical compute device may be predetermined. In another embodiment, a system application of the data processing system may discover a newly attached physical processing device during run time. The system application may retrieve the capabilities of the newly discovered physical compute device to update the data structure representing the attached physical compute devices and their corresponding capabilities.

According to one embodiment, process 400 may receive a compute capability requirement from an application at block 403. The application may send the compute capability requirement to a system application by calling APIs. The system application may correspond to a platform layer of a software stack in a hosting system for the application. In one embodiment, a compute capability requirement may identify a list of required capabilities for requesting processing resources to perform a task for the application. In one embodiment, the application may require the requested processing resources to perform the task in a plurality of threads concurrently. In response, process 400 may select a set of physical compute devices from attached physical compute devices at block 405. The selection may be determined based on a matching between the compute capability requirement against the compute capabilities stored in the capability data structure. In one embodiment, process 400 may perform the matching according to a hint provided by the capability requirement.

Process 400 may determine a matching score according to the number of compute capabilities matched between a physical compute device and the compute capability requirement. In one embodiment, process 400 may select a plurality of physical compute devices with highest matching scores. In another embodiment, process 400 may select a physical compute device if each capability in the capability requirement is matched. Process 400 may determine a plurality of sets of matching physical compute devices at block 405. In one embodiment, each set of matching physical compute devices are selected according to load balancing capabilities. At block 407, in one embodiment, process 400 may generate a compute device identifier for each set of physical compute devices selected at block 405. Process 400 may return one or more of the generated compute device identifiers back to the application through the calling APIs. An application may choose which processing resources to employ for performing a task according to the compute device identifiers. In one embodiment, process 400 may generate at most one compute device identifier at block 407 for each capability requirement received.

At block 409, in one embodiment, process 400 may allocate resources to initialize a logical compute device for a set of physical compute devices selected at block 405 according to a corresponding compute device identifier. Process 400 may perform initializing a logical compute device in response to API requests from an application which has received one or more compute device identifiers according to the selection at block 405. Process 400 may create a context object on the logical compute device for an application. In one embodiment, a context object is associated with one application thread in a hosting system running the application. Multiple threads performing processing tasks in one logical compute device or across different logical compute devices concurrently may be based on separate context objects.

In one embodiment, process 400 may be based on a plurality of APIs including cuCreateContext, cuRetainContext and cuReleaseContext. The API cuCreateContext creates a compute context. A compute context may correspond to a compute context object. The API cuRetainContext increments the number of instances using a particular compute context identified by a context as an input argument to cuRetainContext. The API cuCreateContext does an implicit retain. This is very helpful for 3rd party libraries, which typically get a context passed to them by the application. However, it is possible that the application may delete the context without informing the library. Allowing multiple instances to attach to a context and release from a context solves the problem of a compute context being used by a library no longer being valid. If an input argument to cuRetainContext does not correspond to a valid compute context object, cuRetainContext returns CU_INVALID_CONTEXT. The API cuReleaseContext releases an instance from a valid compute context. If an input argument to cuReleaseContext does not correspond to a valid compute context object, cuReleaseContext returns CU_INVALID_CONTEXT.

Figure 5:
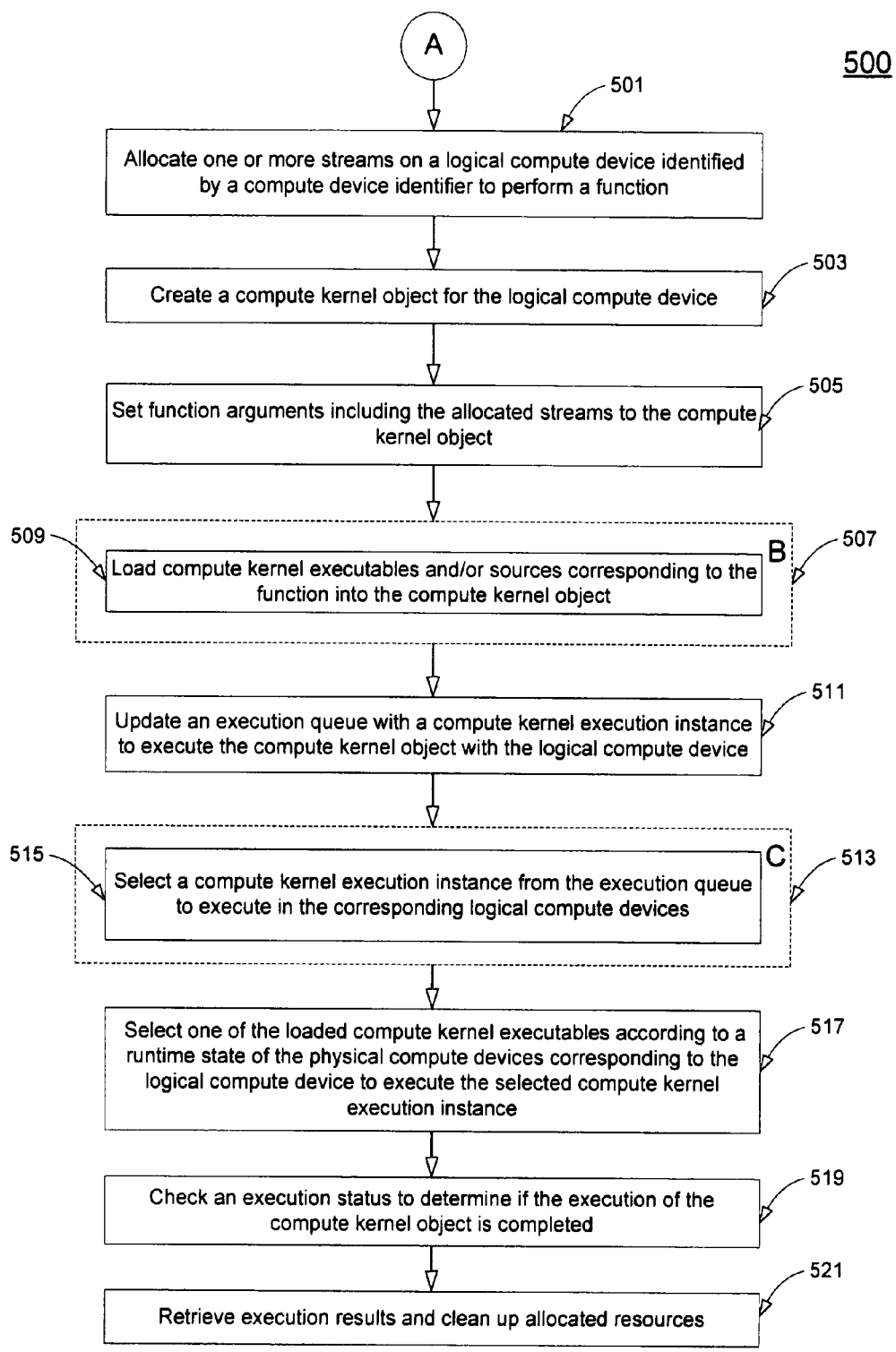
FIG. 5 is a flow diagram illustrating an embodiment of a process to execute a compute executable in a logical compute device.

FIG. 5 is a flow diagram illustrating an embodiment of a process to execute a compute executable in a logical compute device. In one embodiment, process 500 may be performed by a runtime layer in a data processing system such as the compute runtime layer 109 of FIG. 1. At block 501, process 500 may allocate one or more streams that for a compute executable to be run on a logical compute device. A processing task may be performed by a compute executable operating on streams. In one embodiment, a processing task may include input streams and output streams. Process 500 may map an allocated stream memory to/form a logical address of an application. In one embodiment, process 500 may perform operations at block 501 based API requests from an application.

At block 503, according to one embodiment, process 500 may create a compute kernel object for the logical compute device. A compute kernel object may be an object created for the associated streams and executables of the corresponding processing task to perform a function. Process 500 may set up function arguments for a compute kernel object at block 505. Function arguments may include streams allocated for function inputs or outputs, such as the streams allocated at block 501. Process 500 may load compute kernel executable and/or a compute kernel source into the compute kernel object at block 507. A compute kernel executable may be an executable to be executed according to a logical compute device to perform the corresponding processing task associated with a kernel object. In one embodiment, a compute kernel executable may include description data associated with, for example, the type of target physical compute devices, versions, and/or compilation options. A compute kernel source may be the source code where the compute kernel executable is compiled from. Process 500 may load a plurality of compute kernel executables corresponding to a compute kernel source at block 507. Process 500 may load a compute kernel executable from an application or through a compute library such as compute application library 105 of FIG. 1. A compute kernel executable may be loaded with the corresponding compute kernel source. In one embodiment, process 500 may perform operations at blocks 503, 505 and 507 according to API requests from an application.

At block 511, process 500 may update an execution queue to execute the compute kernel object with a logical compute device. Process 500 may execute the computer kernel in response to API calls with appropriate arguments to a compute runtime, e.g. compute runtime 109 of FIG. 1, from an application or a compute application library, such as applications 103 or compute application library 105 of FIG. 1. In one embodiment, process 500 may generate a compute kernel execution instance to execute a compute kernel. API calls to a compute runtime, such as compute runtime 109 of FIG. 1, to execute a compute kernel may be asynchronous in nature. An execution instance may be identified by a compute event object that may be returned by a compute runtime, such as compute runtime 109 of FIG. 1. A compute kernel execution instance may be added to an execution queue to execute a compute kernel instance. In one embodiment, API calls to a compute runtime to execute a compute kernel may include the number of threads that execute simultaneously in parallel on a compute processor and the number of compute processors to use. A compute kernel execution instance may include a priority value indicating a desired priority to execute the corresponding compute kernel object. A compute kernel execution instance may also include an event object identifying a previous execution instance and/or expected number of threads and number of thread blocks to perform the execution. The number of thread blocks and number of threads may be specified in the API calls. In one embodiment, an event object may indicate an execution order relationship between the execution instance that includes the event object and another execution instance identified by the event object. An execution instance including an event object may be required to be executed after another execution instance identified by the event object finishes execution. An event object may be referred to as a queue_after_event_object. In one embodiment, an execution queue may include a plurality of compute kernel execution instances for executing corresponding compute kernel objects. One ore more compute kernel execution instances for a compute kernel object may be scheduled for execution in an execution queue. In one embodiment, process 500 may update the execution queue in response to API requests from an application. The execution queue may be hosted by the hosting data systems where the application is running.

At block 513, process 500 may select a compute kernel execution instance from the execution queue for execution. In one embodiment, process 500 may select more than one compute kernel execution instances to be executed concurrently according to the corresponding logical compute devices. Process 500 may determine whether a compute kernel execution instance is selected from the execution queue based on its associated priority and dependency relationships with other execution instances in the execution queue. A compute kernel execution instance may be executed by executing its corresponding compute kernel object according to an executable loaded to the compute kernel object.

At block 517, in one embodiment, process 500 may select one of the plurality of executables loaded to the compute kernel object corresponding to the selected compute kernel instance for execution in a physical compute device associated with the logical compute device for the compute kernel object. Process 500 may select more than one executables to be executed in more than one physical compute devices in parallel for one compute kernel execution instance. The selection may be based on current execution statuses of the physical compute devices corresponding to the logical compute device associated with the selected compute kernel execution instance. An execution status of a physical compute device may include the number of threads running, the local memory usage level and the processor usage level (e.g. peak number of operations per unit time) etc. In one embodiment, the selection may be based on predetermined usage levels. In another embodiment, the selection may be based on the number of threads and number of thread blocks associated with the compute kernel execution instance. Process 500 may retrieve an execution status from a physical compute device. In one embodiment, process 500 may perform operations to select a compute kernel execution instance from the execution queue to execute at blocks 513 517 asynchronously to applications running in hosting systems.

At block 519, process 500 may check the execution status of a compute kernel execution instance scheduled for execution in the execution queue. Each execution instance may be identified by a unique compute event object. An event object may be returned to an application or a compute application library, such as application 103 or compute application library 105 of FIG. 5, which calls APIs to execute the execution instance, when the corresponding compute kernel execution instance was queued according to a compute runtime, such as the runtime 109 of FIG. 1. In one embodiment, process 500 may perform the execution status checking in response to API requests from an application. Process 500 may determine the completion of executing a compute kernel execution instance by querying a status of the compute event object identifying the compute kernel execution instance. Process 500 may wait until the execution of a compute kernel execution instance is complete to return to API calls from an application. Process 500 may control processing execution instances reading and/or writing from various streams based on compute event objects.

At block 521, according to one embodiment, process 500 may retrieve results of executing a compute kernel execution instance. Subsequently, process 500 may clean up processing resources allocated for executing the compute kernel execution instance. In one embodiment, process 500 may copy a stream memory holding results of executing a compute kernel executable into a local memory. Process 500 may delete variable streams or image streams allocated at block 501. Process 500 may delete a kernel event object for detecting when a compute kernel execution is completed. If each compute kernel execution instance associated with a specific compute kernel object has been completely executed, process 500 may delete the specific compute kernel object. In one embodiment, process 500 may perform operations at block 521 based on API requests initiated by an application.

Figure 6:
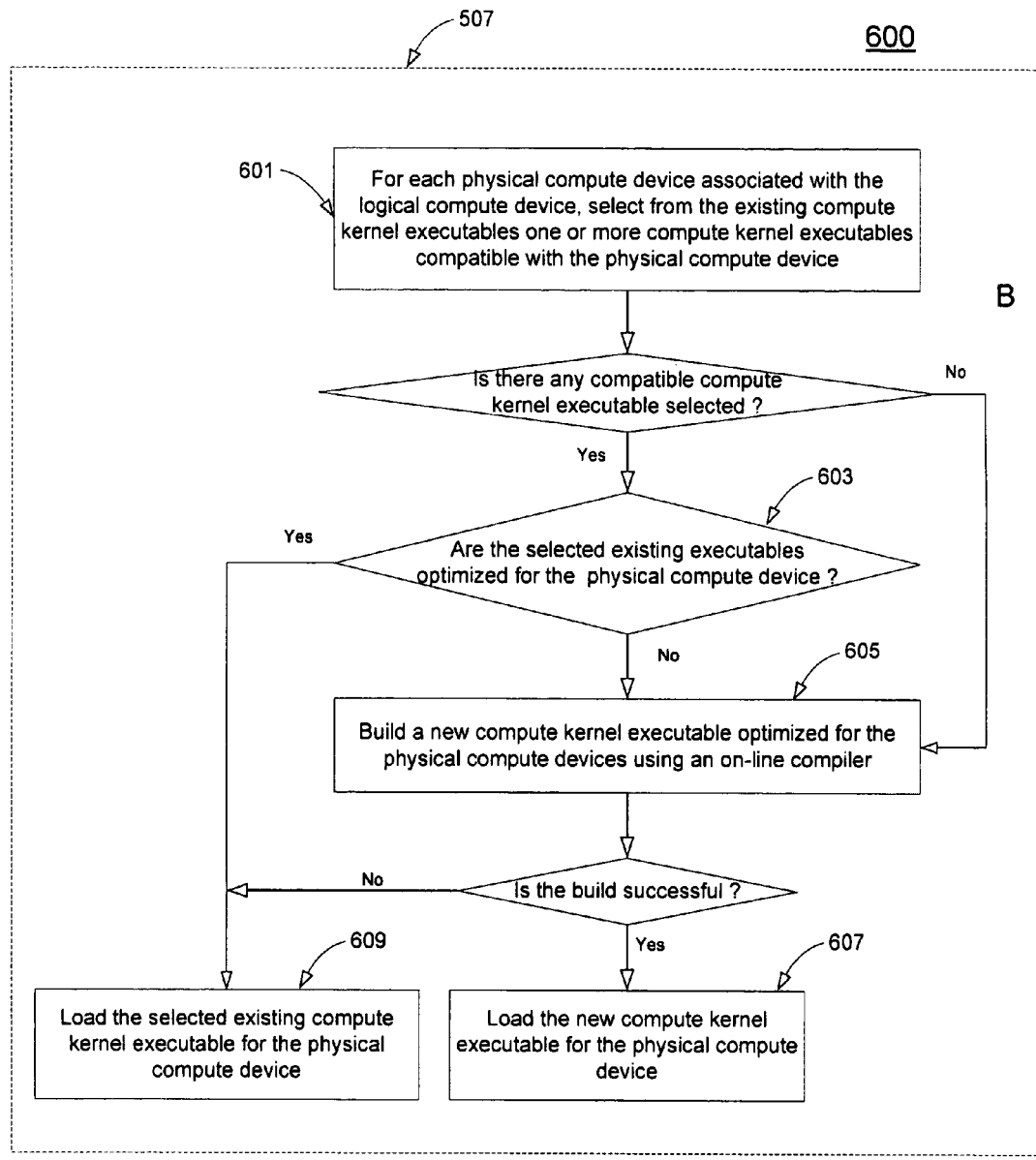
FIG. 6 is a flow diagram illustrating an embodiment of a runtime process to load an executable including compiling a source for one or more physical compute devices determined to execute the executable.

FIG. 6 is a flow diagram illustrating an embodiment of a runtime process to load an executable including compiling a source for one or more physical compute devices determined to execute the executable. Process 600 may be performed as part of process 500 at block 507 of FIG. 5. In one embodiment, process 600 may select, for each physical compute device associated with a logical compute device, one or more existing compute kernel executables compatible with the physical compute device at block 601. A compute kernel executable may be executed in a compatible physical compute device. The existing compute kernel executables may be available from an application or through a compute library such as compute application library 105 of FIG. 1. Each of the selected compute kernel executable may be executed by at least one physical compute device. In one embodiment, the selection may be based on the description data associated with the existing compute kernel executables.

If there are existing compute kernel objects selected, process 600 may determine if any of the selected compute kernel executables is optimized for a physical compute device at block 603. The determination may be based on, for example, the version of the physical compute device. In one embodiment, process 600 may determine that an existing compute kernel executable is optimized for a physical compute device if the version of target physical compute device in the description data matches the version of the physical compute device.

At block 605, in one embodiment, process 600 may build a new compute kernel executable optimized for a physical compute device from the corresponding computer kernel source using an online compiler, such as compute compiler 107 of FIG. 1. Process 600 may perform the online build if none of the selected compute kernel executables are found to be optimized for the physical compute device at block 603. In one embodiment, process 600 may perform the online build if none of existing compute kernel executables are found to be compatible with the physical compute device at block 601. The compute kernel source may be available from an application or through a compute library, such as compute application library 105 of FIG. 1.

If the build at block 605 is successful, in one embodiment, process 600 may load the newly built compute kernel executable into the corresponding compute kernel object at block 607. Otherwise, process 600 may load the selected compute kernel executables to the kernel object at block 609. In one embodiment, process 600 may load a compute kernel executable to a compute kernel object if the compute kernel executable has not yet been loaded. In another embodiment, process 600 may generate an error message if none of existing compute kernel executables for a compute kernel object is compatible with a physical compute device and the corresponding compute kernel source is not available.

Figure 7:
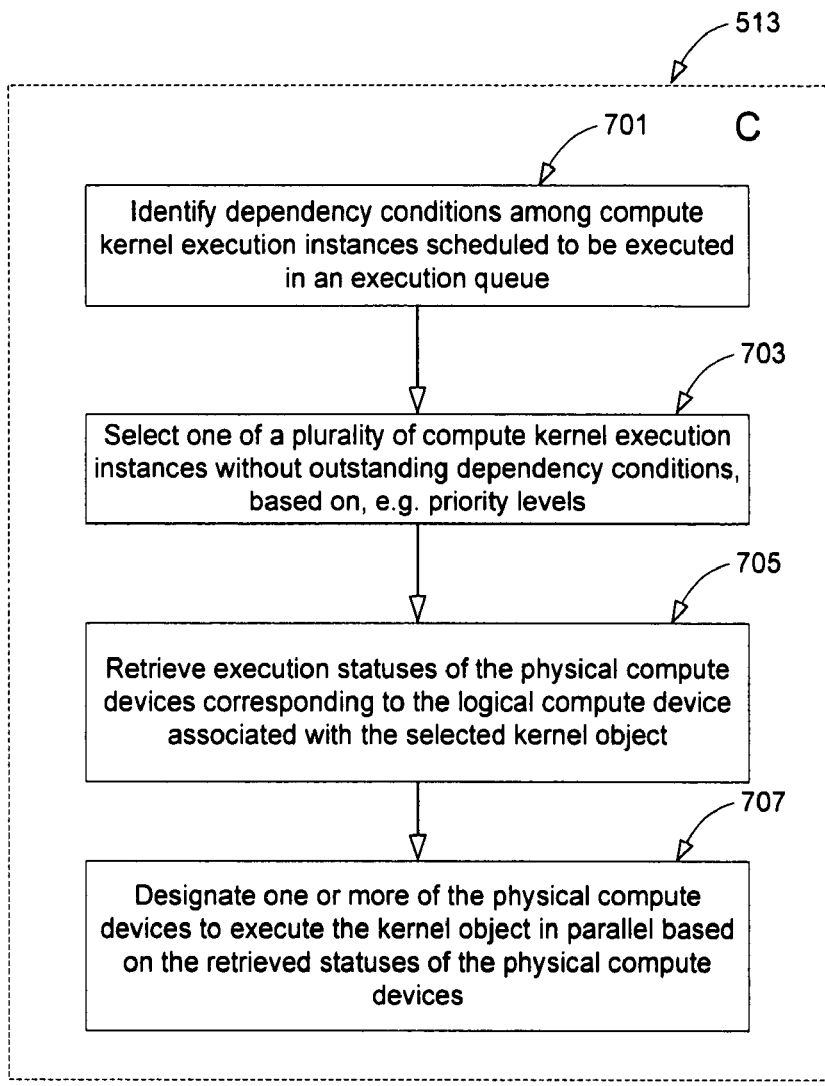
FIG. 7 is a flow diagram illustrating one embodiment of a process to select a compute kernel execution instance from an execution queue to execute in one or more physical compute devices corresponding to a logical compute device associated with the execution instance.

FIG. 7 is a flow diagram illustrating one embodiment of a process to select a compute kernel execution instance from an execution queue to execute in one or more physical compute devices corresponding to a logical compute device associated with the execution instance. Process 700 may be performed as part of process 500 at block 513 of FIG. 5. In one embodiment, process 700 may identify dependency conditions among compute kernel execution instances currently scheduled in an execution queue at block 701. A dependency condition of compute kernel execution instance may prevent execution of a compute kernel execution instance if the condition is outstanding. In one embodiment, a dependency condition may be based on relationships between input streams fed by output streams. In one embodiment, process 700 may detect a dependency condition between execution instances according to input streams and output streams of the corresponding functions for the execution instances. In another embodiment, an execution instance with lower priority level may have a dependency relationship with another execution with high priority level.

At block 703, in one embodiment, process 700 may select a compute kernel execution instances for execution from a plurality of scheduled compute kernel execution instances without any outstanding dependency condition. The selection may be based on a priority level assigned to an execution instance. In one embodiment, the selected compute kernel execution instance may be associated the highest priority level among the plurality of compute kernel execution instances without outstanding dependency conditions. At block 705, process 700 may retrieve current execution statuses for the physical compute devices corresponding to the selected compute kernel execution instance. In one embodiment, execution status of a physical compute device may be retrieved from predetermined memory locations. In another embodiment, process 700 may send a status request to a physical compute device to receive an execution status report. Process 700 may designate one or more of the physical compute devices to execute the selected compute kernel execution instance based on the retrieved execution statuses at block 707. In one embodiment, a physical compute devices may be designated for execution according to a load balancing consideration with other physical compute devices. The selected physical compute device may be associated with an execution status satisfying a predetermined criteria, such as below a predetermined processor usage level and/or memory usage level. In one embodiment, the predetermined criteria may depend on the number of threads and the number of thread blocks associated with the selected compute kernel execution instance. Process 700 may load separate compute kernel executables for the same execution instance or multiple instances to one or more designated physical compute devices to execute in parallel in a plurality of threads.

Figure 8A:
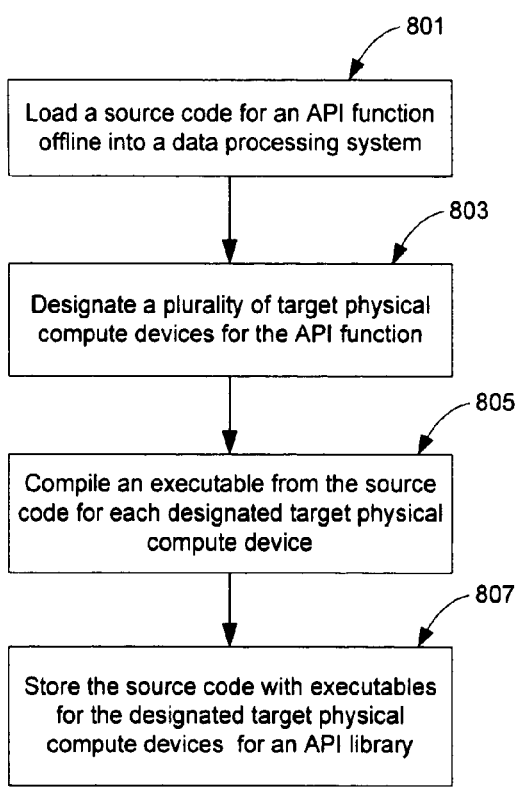
FIG. 8A is a flow diagram illustrating one embodiment of a process to build an API (Application Programming Interface) library storing a source and a plurality of executables for one or more APIs in the library according to a plurality of physical compute devices.

FIG. 8A is a flow diagram illustrating one embodiment of a process to build an API (Application Programming Interface) library storing a source and a plurality of executables for one or more APIs in the library according to a plurality of physical compute devices. Process 800A may be performed offline to load a source code for an API function into a data processing system at block 801. The source code may be a compute kernel source to be executed in one or more physical compute devices. In one embodiment, process 800A may designate a plurality target physical compute devices for the API function at block 803. A target physical compute device may be designated according to types, such as CPU or GPU, versions or vendors. Process 800A may compile the source code into an executable, such as a compute kernel executable, for each designated target physical compute device at block 805. In one embodiment, process 800A may perform the compilation offline based on an online compiler, such as compute compiler 107 of FIG. 1. At block 807, process 800A may store the source code of the API function into an API library with corresponding executables compiled for the designated target physical compute devices. In one embodiment, each executable may be stored with description data including, for example, the type, version and vendor of the target physical compute device and/or compilation options. The description data may be retrieved by a process during run time, such as process 500 of FIG. 5.

Figure 8B:
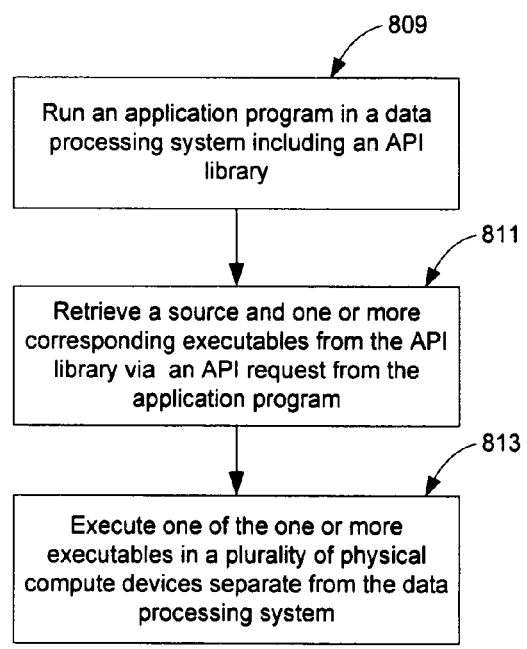
FIG. 8B is a flow diagram illustrating one embodiment of a process for an application to execute one of a plurality of executables together with a corresponding source retrieved from an API library based on API requests.

FIG. 8B is a flow diagram illustrating one embodiment of a process for an application to execute one of a plurality of executables together with a corresponding source retrieved from an API library based on an API request. In one embodiment, process 800B runs an application program, such as application 103 of FIG. 1, in a data processing system, such as in hosting systems 101 of FIG. 1, including an API library, such as compute application library 105 of FIG. 1. At block 811, process 800B may retrieve a source, such as compute kernel source, and one or more corresponding executables, such as compute kernel executables, from the API library based on API requests, such as process 500 at block 507 of FIG. 5. Each executable may be associated with one ore more target physical compute devices. In one embodiment, a compute kernel executable may be backward compatible with a plurality of versions of physical compute devices. At block 813, process 800B may execute one of the retrieved executables based on an API request in a plurality of physical compute devices to perform the associated API function, such as process 500 at block 517 of FIG. 5. Process 800B may run the application at block 809 asynchronously to performing an API function at block 813.

FIG. 9 is a sample source code illustrating an example of a compute kernel source for a compute kernel executable to be executed in a plurality of physical compute devices. Example 900 may be an API function with arguments including variables 901 and streams 903. Example 900 may be based on a programming language for a parallel computing environment such as system 101 of FIG. 1. In one embodiment, the parallel programming language may be specified according to ANSI (American National Standards Institute) C standard with additional extensions and restrictions designed to implement one or more of the embodiments described herein. The extensions may include a function qualifier, such as qualifier 905, to specify a compute kernel function to be executed in a compute device. A compute kernel function may not be called by other compute kernel functions. In one embodiment, a compute kernel function may be called by a host function in the parallel program language. A host function may be a regular ANSI C function. A host function may be executed in a host processor separate from the compute device executing a compute kernel function. In one embodiment, the extensions may include a local qualifier to describe variables that need to be allocated in a local memory associated with a compute device to be shared by all threads of a thread block. The local qualifier may be declared inside a compute kernel function. Restrictions of the parallel programming language may be enforced during compiler time or run time to generate error conditions, such as outputting error messages or exiting an execution, when the restrictions are violated.

FIG. 10 is a sample source code illustrating an example to configure a logical compute device for executing one of a plurality of executables in a plurality of physical compute devices by calling APIs. Example 1000 may be executed by an application running in a host system attached with a plurality of physical compute devices, such as hosting systems 101 of FIG. 1. Example 1000 may specify a host function of a parallel programming language. Processing operations in sample 1000 may be performed as API calls by a process such as process 500 of FIG. 5. Processing operations to allocate streams 1001 and load stream image 1003 may be performed by process 500 at block 501 of FIG. 5. The processing operation to create a compute kernel object 1005 may be performed by process 500 at block 503 of FIG. 5. Processing operation 1007 may load a compute kernel source, such as example 900 of FIG. 9, to the compute kernel object created. Processing operation 1009 may explicitly build a compute kernel executable from the loaded compute kernel source. In one embodiment, processing operation 1009 may load the built compute kernel executable to the created compute kernel object. Subsequently, processing operation 1011 may explicitly select the built compute kernel executable for executing the created compute kernel object.

In one embodiment, processing operation 1013 may attach variables and streams as function arguments for the created compute kernel object. Processing operation 1013 may be performed by process 500 at block 505 of FIG. 5. Processing operation 1015 may execute the created compute kernel object. In one embodiment, processing operation 1015 may be performed by process 500 at block 511 of FIG. 5. Processing operation 1015 may cause an execution queue to be updated with a compute kernel execution instance corresponding to the created compute kernel object. Processing operation 1017 may synchronously wait for a completion of executing the create compute kernel object. In one embodiment, processing operation 1019 may retrieve a result from executing the compute kernel object. Subsequently, processing operations 1021 may clean up allocated resources for executing the compute kernel object, such as an event object, the created compute kernel object and the allocated memories. In one embodiment, processing operation 1017 may be based on whether a kernel event object is set. Processing operation 1017 may be performed by process 500 at block 519 of FIG. 5.

Figure 11:
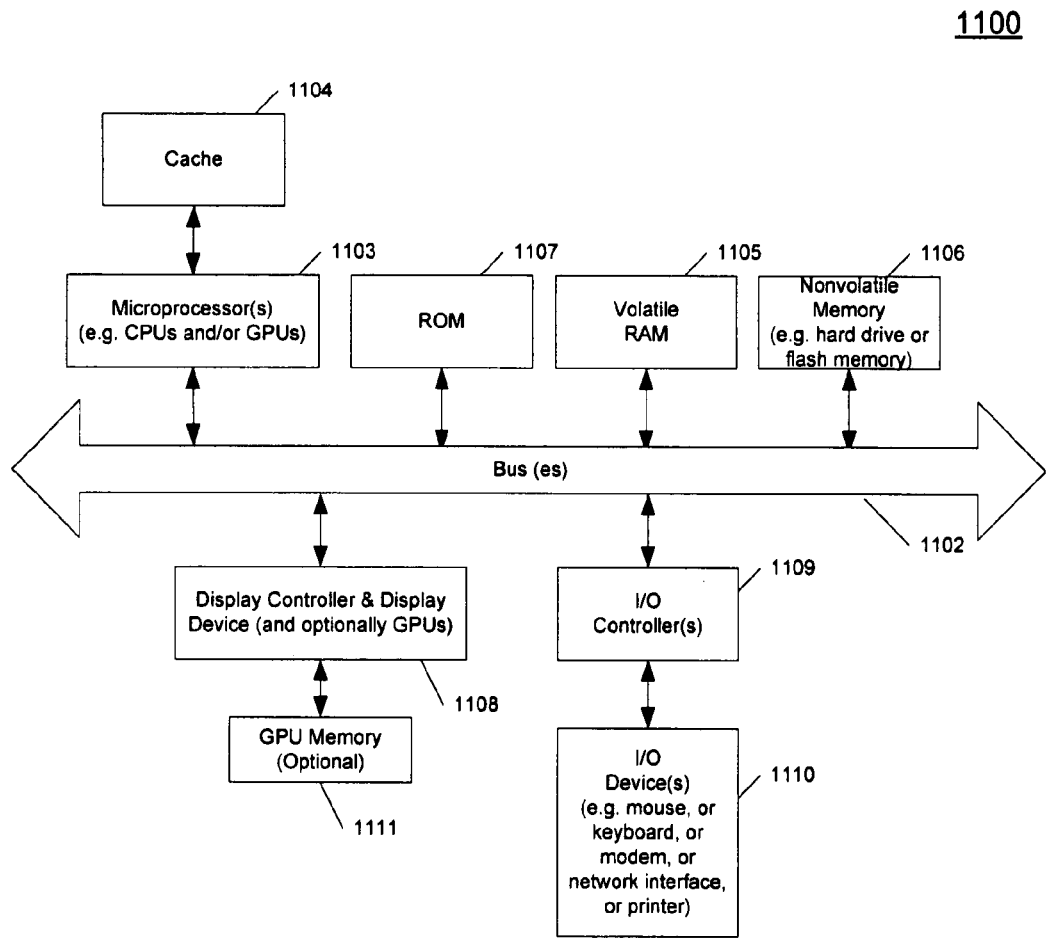
FIG. 11 illustrates one example of a typical computer system with a plurality of CPUs and GPUs (Graphical Processing Unit) which may be used in conjunction with the embodiments described herein.

FIG. 11 shows one example of a computer system which may be used with one embodiment the present invention. For example, the system 1100 may be implemented as a part of the systems shown in FIG. 1. Note that while FIG. 11 illustrates various components of a computer system, it is not intended to represent any particular architecture or manner of interconnecting the components as such details are not germane to the present invention. It will also be appreciated that network computers and other data processing systems_(for example, handheld computers, personal digital assistants (PDAs), cellular telephones, entertainment systems, consumer electronic devices, etc.) which have fewer components or perhaps more components may also be used with to implement one or more embodiments of the present invention.

As shown in FIG. 11, the computer system 1101, which is a form of a data processing system, includes a bus 1103 which is coupled to a microprocessor(s) 1105, such as CPUs and/or GPUs, a ROM (Read Only Memory) 1107, volatile RAM 1109 and a non-volatile memory 1111. The microprocessor

1103 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1113 and to peripheral devices such as input/output (I/O) devices which may be mice, keyboards, modems, network interfaces, printers and other devices which are well known in the art. Typically, the input/output devices 915 are coupled to the system through input/output controllers 1117. The volatile RAM (Random Access Memory) 1109 is typically implemented as dynamic RAM (DRAM) which requires power continually in order to refresh or maintain the data in the memory. The display controller coupled with a display device 1108 may optionally include one or more GPUs to process display data. Optionally, GPU memory 1111 may be provided to support GPUs included in the display device 1108.

The mass storage 1111 is typically a magnetic hard drive or a magnetic optical drive or an optical drive or a DVD RAM or a flash memory or other types of memory systems which maintain data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1103 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A programming language system for a parallel computing architecture, the programming language system implemented by a parallel computing program stored in memory in a system having parallel processors, the system comprising:
a host processor;
a graphics processing unit (GPU) coupled to the host processor;
a memory coupled to at least one of the host processor and the GPU, the memory storing predetermined capabilities for each of the parallel processors, the parallel processors including the host processor and the GPU, the parallel computing program being stored in the memory to allocate threads between the host processor and the GPU and wherein the programming language includes an API to allow an application to make calls using the API to allocate execution of the threads between the host processor and the GPU, wherein the application is associated with a program source code in the programming language, the program source code including a first source code and a second source code, wherein the first source code includes a plurality of APIs for the host processor, the APIs including a first API specifying processing capability requirement for a processing task, the APIs including a second API specifying the second source code for the processing task,
wherein the program source code further comprises at least one API call including at least one processing capability requirement passed to the first API,
wherein the application calls the first API to cause the host processor to match the processing capability requirement specified in the first API and the predetermined capabilities for the parallel processors to select one or more of the parallel processors for the processing task,
wherein said matching selects the at least one processor based on at least one of: a) the predetermined capabilities of the at least one processor satisfying all of the processing capability requirements or b) the predetermined capabilities for the selected processor scoring a highest matching score indicating highest compatibility with the processing capability requirements,
wherein the application calls the second API to cause the host processor to build an executable dynamically to be executed in a selected parallel processor for the processing task, each executable being compiled from the second source code, and wherein the execution of the threads is based on the executables dynamically built.

2. The programming language system of claim 1, wherein the API is called by the application asynchronously.

3. The programming language system of claim 1 wherein the GPU comprises graphics texture mapping hardware to map texture maps onto surfaces to be displayed on a display device.

4. The programming language system of claim 1, further comprising: a central processing unit (CPU) coupled to the host processor, wherein the threads are allocated to be executed in the CPU if the GPU is busy executing graphics processing threads.

5. The programming language system of claim 4, wherein the execution of the threads is allocated in either the CPU or the GPU but not in the host processor.

6. The programming language system of claim 5, wherein separate executables compiled from the second source are executed in the GPU and CPU concurrently for the execution of the threads.

7. The programming language system of claim 6, wherein the executables are built from the second source based on a determination about whether an extension is enabled according to the parallel computing program.

8. The programming language system of claim 7, wherein the executables are associated with one or more function executables according to the extension if the extension is determined to be enabled.

9. The programming language system of claim 8, wherein the one or more function executables include corresponding program sources in the program language for the one or more function executables.

10. The programming language system of claim 9, wherein the one or more function executables are compiled from the corresponding program sources for the GPU and the CPU subsequent to the determination about whether the extension is enabled.

11. The programming language system of claim 7, wherein the one or more function executables perform double precision floating point calculation.

12. A non-transitory machine readable medium containing a program source code having a plurality of tokens for an application, the tokens comprising:
host function tokens corresponding to one or more host functions to be performed in a host processor coupled with one or more compute processors, each compute processor associated with predetermined capabilities stored for the compute processor,
wherein the host function tokens include a first function token and a second function token separately corresponding to a first function and a second function of the host functions, the first function token specifying a processing capability requirement for a processing task, wherein the program source code further comprises at least one call including at least one processing capability requirement passed to the first host function, the second function token specifying a source code for the processing task, the source code including one or more of the compute function data tokens,
wherein the host processor hosts the application to perform the first function for the first function token to cause the host processor to match the processing capability requirement specified and the predetermined capabilities for the compute processors to select one or more of the compute processors for the processing task,
wherein said matching selects the at least one processor based on at least one of: a) the predetermined capabilities of the at least one processor satisfying all of the processing capability requirements or b) the predetermined capabilities for the selected processor scoring a highest matching score indicating highest compatibility with the processing capability requirements,
wherein the host processor hosts the application to perform the second function for the second function token to build a plurality of executables dynamically to be executed in the selected compute processors for the processing task, each executable being compiled from the source code, and
wherein each token comprises at least one of an API (Application Programming Interface) call, a variable, a stream, a qualifier, or an extension for the source code.

13. The machine readable medium of claim 12, wherein the one or more compute processors are CPUs or GPUs.

14. The machine readable medium of claim 12, wherein the tokens further comprise compute kernel function data tokens corresponding to one or more compute kernel functions to be performed in one or more compute processors separate from the host processor, and wherein when the tokens are loaded into a data processing system, causes the data processing system to perform a method, the method comprising:
  identifying a token calling one of the one or more compute kernel functions;
  determining if the token is one of the compute kernel function tokens; and
  generating an error condition if the token is one of the compute kernel function data tokens.

15. The machine readable medium of claim 14, further comprising:
  generating a plurality of instructions from the tokens, the plurality of instructions including host function instructions corresponding to the one or more host functions and compute kernel function instructions corresponding to the one or more compute kernel functions.

16. The machine readable medium of claim 15, wherein host function instructions causes the data processing system to perform restriction checking method in a processor, the method comprising:
  determining if the processor is one of the one or more host processor; and
  generating an error condition if the processor is determined not to be any of the one or more host processors.

17. The machine readable medium of claim 15, wherein the compute kernel function instructions perform the one or more compute kernel functions in the one or more compute processors by a plurality of threads concurrently according to an API request, the host function instructions calling the API request.

18. An extended programming language system having tokens in a program source for an application, including
  a processor,
  a memory coupled to the processor storing the tokens,
  the tokens comprising:
  standard tokens scheduling a plurality of threads for execution on a plurality of processors in parallel, the plurality of processors including central processing units (CPUs) and graphic processing units (CPUs), wherein predetermined capabilities are stored for each of the processors;
  and extended tokens implementing executables for the plurality of threads,
  wherein the standard tokens include a first token and a second token separately corresponding to a first function and a second function of a host processor, the first token specifying a processing capability requirement for a processing task,
  wherein the program source code further comprises at least one call including at least one processing capability requirement passed to the first function, the second token specifying a particular source code for the processing task, the particular source code including one or more of the extended tokens,
  wherein the host processor hosts the application to perform the first function for the first token to cause the host processor to match the processing capability requirement specified and the predetermined capabilities for the processors to select one or more of the processors for the processing task,
  wherein said matching selects the at least one processor based on at least one of: a) the predetermined capabilities of the at least one processor satisfying all of the processing capability requirements or b) the predetermined capabilities for the selected processor scoring a highest matching score indicating highest compatibility with the processing capability requirements,
  wherein the host processor hosts the application to perform the second function for the second token to build a plurality of executables dynamically to be executed in the selected processors for the processing task, each executable being compiled from the second source code, and
  wherein each token comprises at least one of an API (Application Programming Interface) call, a variable, a stream, a qualifier, or an extension for the particular source code.

19. The extended programming language of claim 18, wherein the plurality of processors are selected based on an API call included in the standard tokens.

20. The extended programming language of claim 19, wherein the executables are compiled in the host processor.

21. The extended programming language of claim 18, wherein the host processor hosts the API call, the host processor being separate from the plurality of processors.

22. An extended programming language based method, the language having tokens including one or more standard tokens and one or more extended tokens, the tokens cause a data processing system to perform the method comprising:
  performing a task in a host processor according to the one or more standard tokens in a program source code to schedule a plurality of threads for execution on a plurality of processors in parallel, the plurality of processors coupled to the host processor including central processing units (CPUs) and graphic processing units (CPUs), wherein predetermined processing capabilities are stored for each processor; and executing an executable for an application according to the extended tokens for at least one of the plurality of thread on at least one of the plurality of processors, wherein the standard tokens include a first token and a second token separately corresponding to a first function and a second function of the host processor,
  the first token specifying a processing capability requirement for a processing task, wherein the program source code further comprises at least one call including at least one processing capability requirement passed to the first function, the second token specifying a particular source code for the processing task, the particular source code including one or more of the extended tokens,
  wherein the host processor hosts the application to perform the first function for the first token to cause the host processor to match the processing capability requirement specified and the predetermined capabilities for the processors to select the at least one of the plurality of processors for the processing task,
  wherein said matching selects the at least one processor based on at least one of: a) the predetermined capabilities of the at least one processor satisfying all of the processing capability requirements or b) the predetermined capabilities for the selected processor scoring a highest matching score indicating highest compatibility with the processing capability requirements,
  wherein the host processor hosts the application to perform the second function for the second token to build the executable dynamically to be executed in the selected processor for the processing task, the executable being compiled from the particular source code and wherein each token comprises at least one of an API (Application Programming Interface) call, a variable, a stream, a qualifier, or an extension for the particular source code.

23. The extended programming language of claim 22, wherein the standard tokens cause the data processing system to call APIs including at least one of: (a) a call to create a compute kernel object; (b) a call to load a compute kernel source; (c) a call to load a compute executable kernel; (d) a call to obtain configuration information; (e) a call to compile a compute kernel executable; (f) a call to create a context for a compute device; (g) a call to delete a created context for a compute device; (h) a call to allocate a variable memory stream; (i) a call to allocate a data memory stream; (j) a call to delete an allocated memory stream; (k) a call to read or write an allocated memory stream; (l) a call to map a memory stream to/from a client's address space; (m) a call to execute a compute kernel object; (n) a call to determine a status of a compute kernel object; (o) a call to delete a compute kernel event object; and (p) a call to delete a compute kernel object.

24. The extended programming language of claim 23, wherein the plurality of threads are scheduled according to the kernel event object.

25. The extended programming language of claim 23, wherein the task including selecting the plurality of processors based on the configuration information.

26. The extended programming language of claim 23, wherein the call to execute the compute kernel object and the executing the executable are asynchronous.

* * * * *